Sept. 27, 1932.   W. S. FINHOLM   1,879,151
RECORDING MECHANISM
Filed May 6, 1931   2 Sheets-Sheet 1
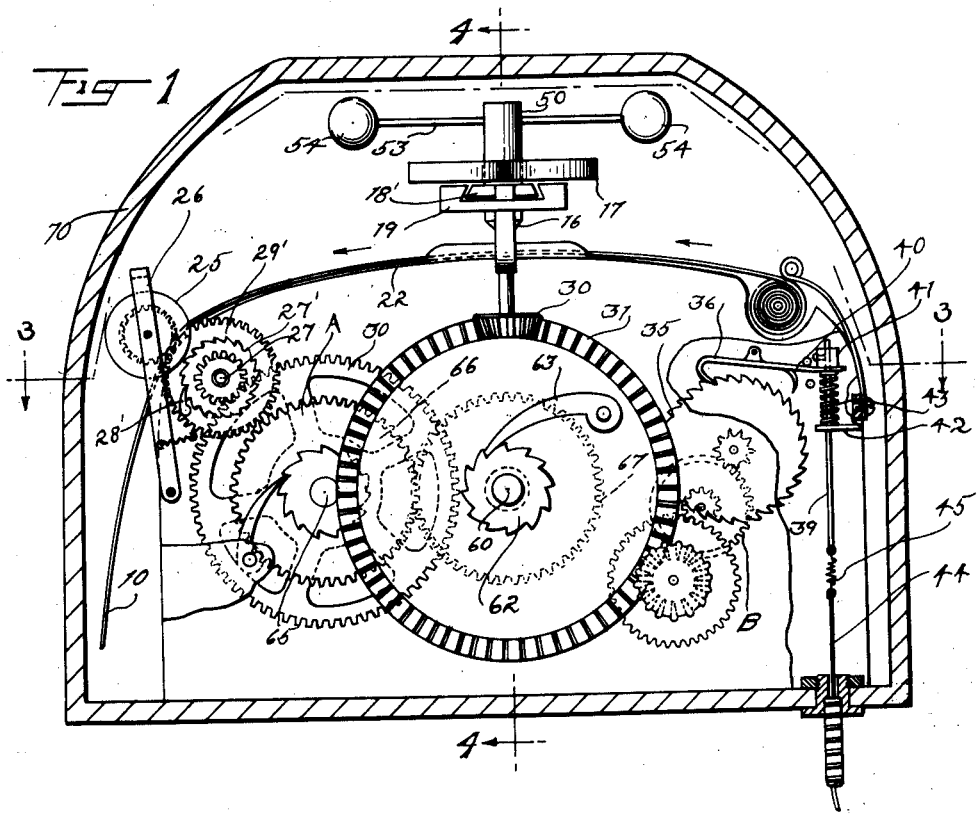
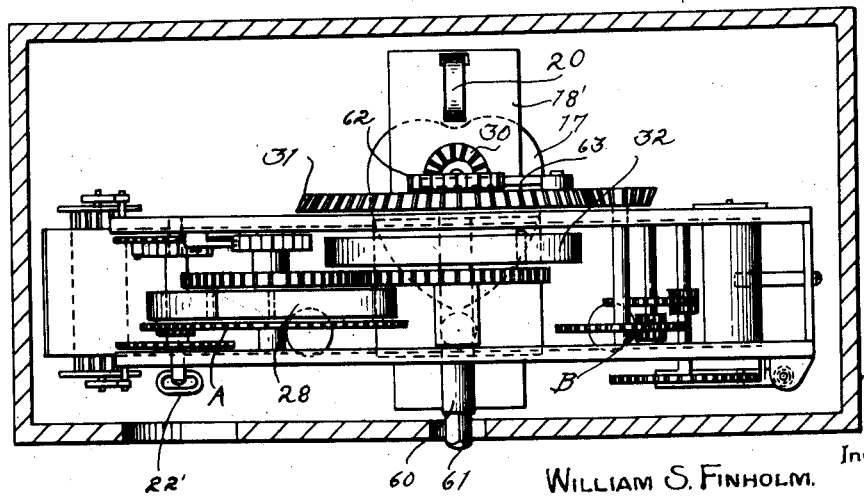
Inventor
WILLIAM S. FINHOLM.
By Clarence A. O'Brien
Attorney Sept. 27, 1932.                W. S. FINHOLM                1,879,151
                            RECORDING MECHANISM
                   Filed May 6, 1931            2 Sheets-Sheet 2
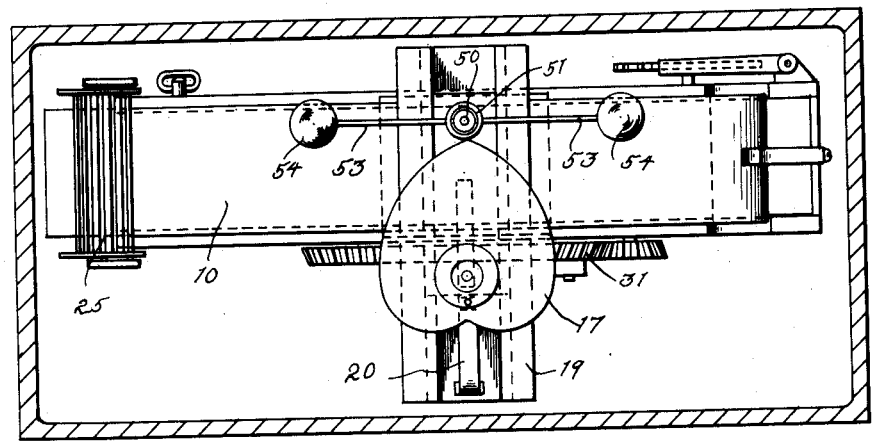
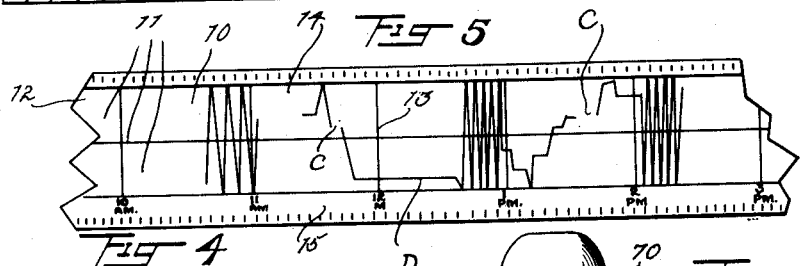
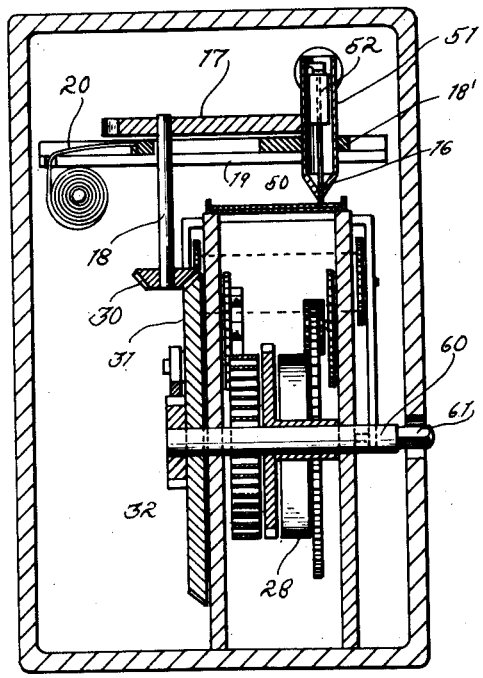
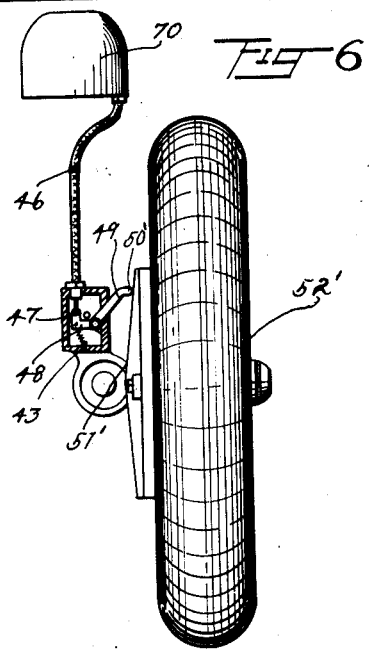
Inventor
WILLIAM S. FINHOLM.
By Clarence A. O'Brien
                Attorney Patented Sept. 27, 1932

1,879,151

UNITED STATES PATENT OFFICE

WILLIAM S. FINHOLM, OF FOREST HILLS WEST, NEW YORK

RECORDING MECHANISM

Application filed May 6, 1931. Serial No. 535,472.

This invention relates to new and useful improvements in recorders, and more particularly it pertains to means for making a permanent record of the various operations of a machine, it being shown in its present embodiment in connection with a motor vehicle.

When motor vehicles are operated in fleets for public service such as hacking, trucking and the like it is highly desirable that the owner of the vehicles have a means for checking up the operations and performances of the individual vehicles and it is the object of the present invention to provide a novel mechanism which makes an accurate record of the several operations of individual motor vehicles.

A feature of the invention resides in a novel mechanism whereby the various operations such as idle, idle with motor running, travel over a roadway and speed of operation may be accurately recorded in the form of a permanent record over which the operator of the vehicle has no control.

A further feature of the invention resides in a novel form of marking device together with a novel form of mechanism for operating the marker relative to the element upon which the record is made.

The present invention contemplates the use of a tape preferably of paper, upon which the record is made, and a further feature of the invention resides in the employment of two spring motors, one of which drives the tape, the other serving to move the marker transversely of the tape under certain operating conditions.

Still a further feature of the invention resides in a novel mechanism whereby the two motors heretofore referred to may be simultaneously wound and yet operate independently of each other in driving their respective mechanisms.

I am aware that such devices have heretofore been constructed, but in all such cases with which I am familiar, two marking devices are employed, separately to record travel and vibration, and it is a further feature of this invention so to construct a recording mechanism of the afore-mentioned type in which a single marking device performs all necessary marking operations incident to a complete operating record.

Still another feature of the present invention resides in the provision of a novel form of tape feeding mechanism whereby the tape is fed at a uniform rate of speed as distinguished from those mechanisms in which the tape is wound upon a drum whose diameter constantly increases with the result that the rate of feed of the tape correspondingly increases thus producing an inaccurate record.

Other features of the invention relate to certain novel and improved constructions, arrangements and combinations of parts hereinafter described and particularly pointed out in the claims, the advantages of which will be readily understood and appreciated by those skilled in the art.

The invention will be readily understood from the accompanying drawings illustrating the invention in its preferred form, and the following detailed description of the constructions therein shown.

Referring to the drawings,

Figure 1 is a vertical sectional view taken through the device as constructed in accordance with the present invention, Figure 2 is an inverted horizontal sectional view thereof, Figure 3 is a horizontal sectional view taken on the line 3—3 of Figure 1, Figure 4 is a vertical sectional view taken on the line 4—4 of Figure 1, Figure 5 is a plan view of a section of the record tape used in the device, and;

Figure 6 is a view in elevation showing the manner of operation or control of the device.

In its present embodiment, the invention contemplates the use of a record tape which is moved continuously past a given point. The rate of speed at which the tape is moved is constant, and the tape is divided both lengthwise and transversely for a purpose to be hereinafter specifically described.

While the record tape employed may be of any desired type, the type herein illustrated consists of a relatively narrow strip of paper 10. This strip of paper 10 is divided by longitudinally extending lines 11 into four spaces 12. These spaces are employed to designate quarter miles, and thus by reading of the inscription upon the tape, the number of miles travelled by the vehicle so equipped can be ascertained as will be hereinafter described. The tape is also divided by means of transverse calibrations 13 into spaces 14 which designate periods of time and in the present tape, these spaces each designate one hour and may be divided up into fractional periods thereof by small calibrations or the like 15.

In its movement past the given point heretofore mentioned, inscriptions are made upon the tape by a suitable marker and in the present embodiment of the invention, this marker is in the form of a pen or pencil 16 which rests directly upon the tape and is moved transversely thereof by means of a cam or the like 17 carried by a shaft 18. To permit of transverse movement of the pencil, the same is mounted in a carriage 18' which moves in suitable guideways 19 in one direction under the influence of the cam 17 heretofore mentioned and in the other direction by means of a spring or the like 20.

The tape in its movement rests upon a suitable plate 22 and this plate forms a suitable support for the marking device 16.

Means is provided for feeding the tape 10, and in the present embodiment of the invention, this means comprises a feed roller 25 which is mounted in a suitable frame 26 and cooperates with a feed roller 27. The feed rollers 25 and 27 are geared to operate in unison, and are operated by a suitable train A which is driven by means of a spring or the like 28.

To provide for adjustment of the record tape 10 relative to the feed rollers 25 and 27 when a new record tape is introduced into the device, the feed roller 27 has a ratchet 27' with which a pawl 28' carried by the gear 29' meshes. Thus as the feed roller 27 is driven by the gear 30' of the train A, the pawl 28' by reason of its engagement with the ratchet 27' causes rotation of the gear 29' to drive the feed roller 25, but when the feed roller 27 is operated by the hand key 22' the ratchet pawl 28' rides freely around the ratchet 27' thus permitting adjustment of the record tape.

The shaft 18 of the cam 17 carries a bevel gear 30 which in turn is driven by a bevel gear 31 the power for which is provided by means of a spring 32.

The gear train A is so constructed and arranged as to drive the record tape 10 continuously at a given rate of speed which is such that one of the spaces of the record tape defined by the transverse lines 13 will pass a given point within an hour. The mechanism just described, however, which drives the marking device is intermittently operated and is controlled by means of a train of gearing B including an escapement wheel 35. An escapement arm 36 engages the escapement wheel 35 and releases the same to operation to permit of operation of the bevel gear 31 which drives the bevel gear 30.

Means is provided to operate the escapement arm 36 from one of the wheels of the vehicle, and this means comprises a reciprocating rod or the like 39 the upper end of which passes through an opening in the end or extension 40 of the escapement arm 36 and is adjustably mounted therein by means of a collar or the like 41. Interposed between the extension of the escapement arm 36 and a stationary bracket or the like 42, there is a coil spring 43 which tends to exert pressure against the collar 41 and operate the rod 39 in one direction. The rod 39 is operated in the opposite direction by means of a reciprocating rod 44 connected to the rod 39 by means of a coil spring or the like 45. By reference to Figure 6 of the drawings, it will be noted that the rod 44 is enclosed in a suitable housing or protecting casing 46 and is connected as at 47 at its lower end to a rocking arm or bell crank 48. This rocking arm or bell crank is operated by an arm or lever 49 which in turn has a free end 50' riding upon a cam 51' carried by one of the wheels 52' of the vehicle. Thus each time the high portion of the cam 51' rides by the free end 50' of the lever 49, the bell crank 48 will be rocked about its pivotal point and will exert a pull upon the rod 44 which is transmitted by means of the spring 45 to the rod 39 thus disengaging one end of the escapement arm with respect to the tooth wheel 35 and engaging the other end of the escapement arm with said tooth wheel to permit a one step movement of the gear train B to permit operation of the bevel gear 31 under the influence of its spring 32. The spring 45 is provided to prevent undue strain and resultant damage to the escapement mechanism. As the free end 50 of the lever 49 rides over the low portion of the cam, the spring 43 serves to return the escapement arm 36 to its initial position, thus giving another step in the operation of the gear train B. By this construction it will be obvious that as the wheel 52' rotates, an intermittent escapement of the gear train B is permitted and a consequent intermittent driving of the bevel gear 31, the gear 30, and the cam 17 results.

As the cam 17 rotates, the marker will be moved transversely across the record strip in a back and forth manner, and it will be obvious that this movement of the marker transversely of the record strip will be controlled by the speed at which the vehicle travels, that is to say the more rapidly the vehicle travels, the greater will be the number of transverse movements of the marker transversely of the strip thus providing a reading by which the speed at which the vehicle was operated during any period of time may be ascertained by a glance at the inscriptions upon the record strip.

From the foregoing it will be apparent that if the tape is fed past the marker at a given rate of speed, the inscriptions upon the tape will indicate the speed at which the vehicle travels, and if there are a relatively large number of transverse inscriptions upon the record strip between the lines 13 indicating the hourly periods upon the record strip, it will indicate that the vehicle was driven at a greater rate of speed than if a fewer number of said transverse inscriptions occupy the same space on the record tape.

The marking device is of a highly sensitive character, and is so constructed and arranged that when the vehicle is standing idle with its motor idle, there will be no inscription upon the record tape 10 even though it is moving relative to the marker and these periods are indicated C upon the record strip, there being no inscription at these points. The marker is also intended to indicate upon the record tape such periods as the vehicle was standing with the motor running, and this inscription is designated by the reference character D upon the drawings and consists merely of a straight line, although the marker is so highly sensitive that this particular inscription indicating the periods of operation of the motor with the vehicle standing will appear in different degrees of intensity depending upon the speed of operation of the motor, it appearing heavier as the speed of operation of the motor is increased.

To obtain these results in the marker, the marker is constructed in such a manner that it is subject to slight vibrations of the vehicle and in the present embodiment of this invention, the marker which has heretofore been designated 16 consists of a rod or the like 50 mounted in a suitable ink carrying housing 51. The upper end of the rod is weighted as at 52, and is provided with resilient arms 53 which extend in diametrically opposite directions from the marker. Each of these arms 53 carries a weight 54 and these weights are preferably located upon the outer extremity of the arms 53.

By this construction, when the motor of the vehicle is running even though the vehicle be not moving, the slight vibrations attendant the operation of the motor will through the medium of the weights 54 and the resilient arms 53, cause the marker to bear upon the marking tape with sufficient pressure and vibrations of the marker to cause the inscriptions designated by the reference character D which inscriptions indicate that the motor of the vehicle was running and the speed at which it was running, but that the vehicle was not in motion. When the vehicle is standing and the motor not running, there will be no vibration and the marker will close the lower end of the receptacle 51 and there will be no inscription upon the record tape which breaks are designated C in the drawings and indicate that the vehicle was standing and its motor was not running.

Thus it will be apparent that by a reading of the tape, the entire operation of the vehicle as to periods standing with motor idle, periods standing with motor running, number of miles travelled by the vehicle and the rate of speed at which each mile was travelled may be ascertained.

Means is provided by which the two springs 28 and 32 heretofore mentioned may be simultaneously wound, and in the present instance this means comprises a shaft 60 having a squared end 61 for the reception of a suitable winding key. The shaft 60 has a ratchet wheel 62 and engaging said ratchet wheel 62 there is a pivoted pawl 63 which holds the spring under the tension under which it is placed by winding. The spring 32 heretofore mentioned is carried directly upon this shaft 60, while the spring 28 heretofore mentioned is carried upon a shaft 65 which carries a gear 66 of the train A which meshes with a gear 67 carried by the shaft 60 and which causes a rotation of the gear 66 as the shaft 60 is being rotated by the key 61.

From the foregoing it will be apparent that the present invention provides a new and improved form of recorder in which a single marker is employed to do the work of a plurality of markers as heretofore employed and in which a complete record of the operation of a motor vehicle may be ascertained.

I have illustrated a conventional form of casing designated 70 in which the entire mechanism is to be enclosed and to which access may be had by means of a door located in any suitable position in order that the parts may be reached for repair and also for the purpose of placing and removing record tape.

The invention has been herein illustrated in its preferred form, but it is to be understood that the invention is not to be limited to the specific construction and arrangement of parts herein illustrated, and that it may be practiced in such other forms as rightfully fall within the scope of the appended claims.

Having thus described the invention, what is claimed as new and what it is desired to secure by Letters-Patent of the United States, is;

1. In a device of the character described, a travelling tape, and a normally inoperative marker for inscribing on said tape, said marker being floating, and resting on said tape.

2. In a device of the character described, a travelling tape, a marker for inscribing on said tape, said marker being floating and resting on said tape, and means for exerting varying degrees of pressure on said marker to vary the degree of intensity of the mark made thereby.

3. In a device of the character described, a travelling tape, a normally inoperative marker for inscribing on said tape, said marker being floating and resting on said tape, and means for exerting varying degrees of pressure on said marker, said means comprising a plurality of weights carried by the marker.

4. In a device of the character described, a travelling tape, a maker for inscribing on said tape, said marker being floating and resting on said tape, and means for exerting varying degrees of pressure on said marker, said means comprising a plurality of weights carried by the marker, and means for resiliently connecting said weights to the marker.

5. In a device of the character described, a travelling tape, a marker for inscribing on said tape, said marker being floating and resting on the tape, a plurality of resilient arms extending radially of said marker, and a weight mounted upon the free end of each of said resilient arms.

In testimony whereof I affix my signature.

WILLIAM S. FINHOLM.